US010929396B1

(12) United States Patent
Bhatia et al.

(10) Patent No.: US 10,929,396 B1
(45) Date of Patent: Feb. 23, 2021

(54) MULTI-TYPE ATTRIBUTE INDEX FOR A DOCUMENT DATABASE

(71) Applicant: Amazon Technologies, Inc., Seattle, WA (US)

(72) Inventors: Sandeep Bhatia, Bothell, WA (US); Kanishka Chaturvedi, Seattle, WA (US); Maruthi Manohar Reddy Devarenti, Renton, WA (US); VamsiKrishna Chaitanya Manchem, Kirkland, WA (US); Andrew Whitaker, Seattle, WA (US); Ming-chuan Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 335 days.

(21) Appl. No.: 15/818,687

(22) Filed: Nov. 20, 2017

(51) Int. Cl.
*G06F 16/2453* (2019.01)
*G06F 16/81* (2019.01)
*G06F 16/93* (2019.01)
*G06F 9/54* (2006.01)

(52) U.S. Cl.
CPC ........ *G06F 16/24542* (2019.01); *G06F 9/547* (2013.01); *G06F 16/81* (2019.01); *G06F 16/93* (2019.01)

(58) Field of Classification Search
CPC .... G06F 16/24542; G06F 16/93; G06F 16/81; G06F 9/547; G06F 21/6227; G06F 16/248; G06F 16/2228
See application file for complete search history.

(56) References Cited

U.S. PATENT DOCUMENTS

| 6,366,934 | B1 | 4/2002 | Cheng et al. |
| 7,305,613 | B2 | 12/2007 | Oezgen |
| 8,601,000 | B1 * | 12/2013 | Stefani ................. G06F 16/278 707/747 |
| 9,390,159 | B2 | 7/2016 | Junkergard et al. |
| 2003/0055834 | A1 * | 3/2003 | Hansen ............... G06F 16/2228 |
| 2007/0027860 | A1 * | 2/2007 | Bestgen ............ G06F 16/24544 |
| 2010/0325169 | A1 * | 12/2010 | Loh .......................... G06F 7/00 707/803 |
| 2012/0330954 | A1 * | 12/2012 | Sivasubramanian ....................... G06F 9/5061 707/737 |

* cited by examiner

*Primary Examiner* — Robert W Beausoliel, Jr.
*Assistant Examiner* — Mohammad Solaiman Bhuyan
(74) *Attorney, Agent, or Firm* — Robert C. Kowert; Kowert, Hood, Munyon, Rankin & Goetzel, P.C.

(57) ABSTRACT

Multi-type attribute indexes may be implemented for document databases. When a request to perform a query at a document database is received that is directed toward in indexed attribute that has multiple data types for values stored in the multi-type attribute index, a predicate in the query may be replaced with a different predicate that is applicable to search the multi-type attribute index according to a sort order for the multiple data types stored in the at multi-type attribute index. A plan that includes the different predicate may be performed in order to provide a result of the query to a user.

20 Claims, 8 Drawing Sheets

MULTI-TYPE ATTRIBUTE INDEX FOR A DOCUMENT DATABASE

BACKGROUND

Indexing schemes provide data management systems, such as databases, with fast querying capabilities. Instead of scanning an entire data set, the data management system may apply search criteria, such as query predicates, to the evaluation of an index, which may be optimized to map the location of data satisfying the search criteria to portions of the index. However, semi-structured data, such as data found in document databases, NoSQL, or other non-relational data storage systems, can be more difficult to index as the relationships between data may not be strictly defined according to a common structure. Indexing techniques that can provide faster performance for semi-structured data are therefore highly desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein implement multi-type attribute index for a document database, according to some embodiments. Indexing techniques organize data in order improve the performance or searches or queries directed to the data, in various embodiments. An index may, for instance, identify locations (or store the data therein), desired in a query in a structure, such as b-tree, that can be efficiently searched to discover all of the values that satisfy the query, in some embodiments. Multi-type attribute indexes may provide an index structure that provides a highly performant search structure for data sets, such as a document database, with multiple types of data possibly stored to represent the same value, in various embodiments, instead of limiting different data types to separately maintained indexes or translating or reformatting data into a common data type. In this way, multi-type attribute indexes can reduce system overhead from maintaining separate indexes for different data types of the same attribute, reduce processing costs of the database system to maintain and update the indexes, and other index management challenges that can increase according to the number of indexes maintained.

Figure 1:
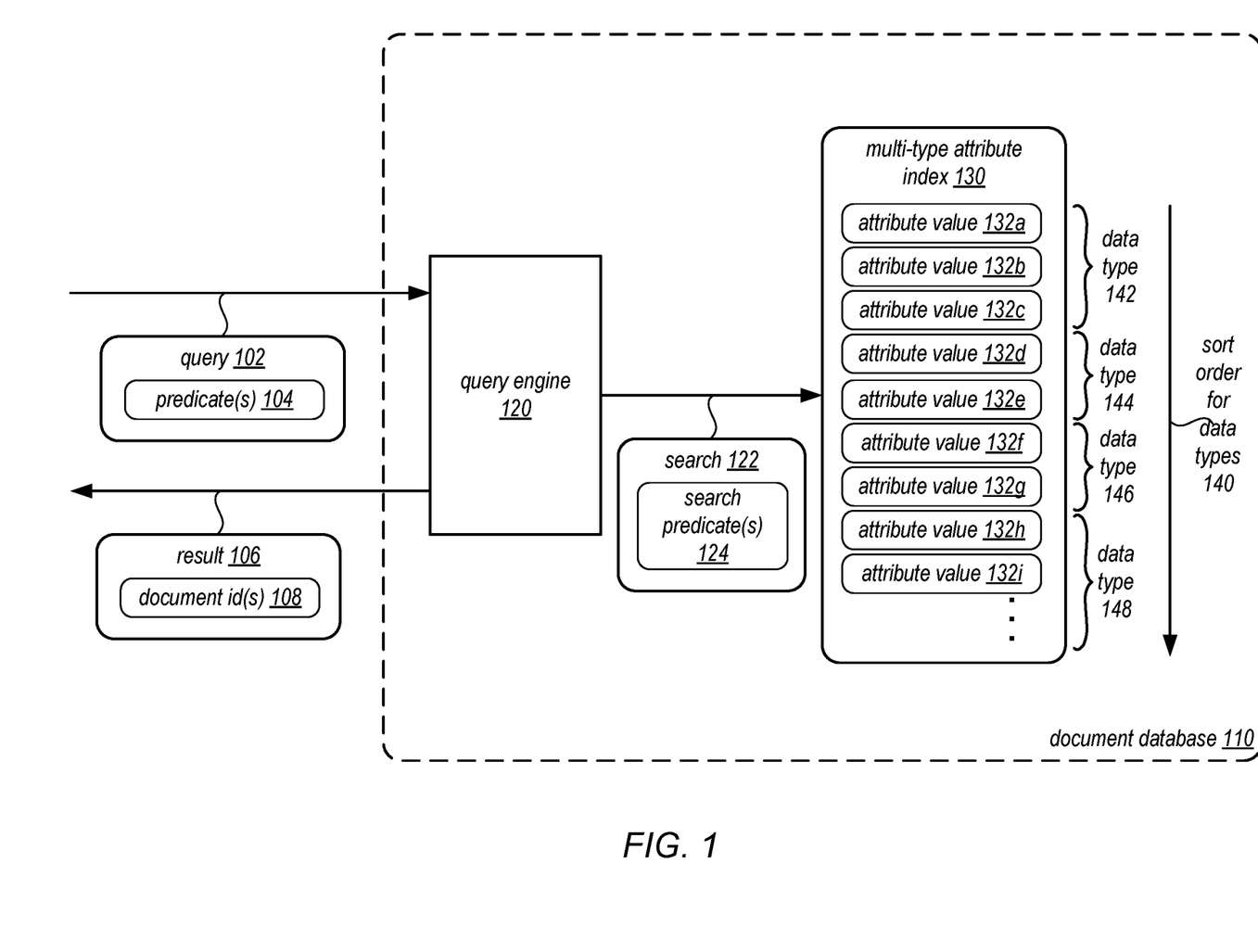
FIG. 1 is a logical block diagram illustrating a multi-type attribute index for a document database, according to some embodiments.

FIG. 1 is a logical block diagram illustrating a multi-type attribute index for a document database, according to some embodiments. Document database 110 may store data that is non-relational or semi-structured in various embodiments. For example, document database 110 may store documents that specify various attributes which may be shared with other documents (e.g., different documents have "attribute a", although they may have different values) or attributes which are exclusive to a particular document (e.g., only one document has "attribute z"). Even documents that share attributes may have different data types for values (e.g., string, integer, array, timestamp, or custom data types, among other data types). Some data types may have multiple values, as discussed below with regard to FIG. 4.

Multi-type attribute index 130 may be created for an attribute of documents stored in document database 110. Different data types, such as data types 142, 144, 146, and 148 may have values, such as attribute values 132a, 132b, 132c, 132d, 132e, 132f, 132g, 132h, 132i and so on, stored as entries (e.g., leaf nodes in a b-tree) as part of multi-type attribute index 130. Multi-type attribute index 130 may be created and maintained using a variety of different index structure formats, such as tree-based structures like a b-tree or hash-based structures, among others. Multi-type attribute index 130 may store entries according to a sort order for data types 140 which allows for comparisons across data types to be made. If the sort order, for example were array<string<integer, then any array attribute value would be less than any string value. Implementing sort order for data types 140 may allow for type bracketing (e.g., restricting queries to searching for those types of data values specified in the query predicates), in some embodiments, as discussed below with regard to FIGS. 4-6.

Document database 110 may implement a query engine 120 to provide access to documents stored in document database 110. Queries, such as query 102, may include one or more predicate(s) 104, which may identify attribute values of documents that a user or system that submitted query 102 may wish to identify. Query engine 120 may interpret the query 102 and may recognize if the query 102 includes a predicate 104 that is directed to an attribute that has been indexed, such as the attribute for multi-type attribute index 130. For such queries, query engine 120 may generate a query plan that replaces the predicate 104 in the query for the attribute with a different predicate, such as search predicates 124. In this way, the appropriate portion of the multi-type attribute index 130 may be searched. For instance, if the query 102 has a predicate 104 that identifies a range of integer values (e.g., attribute a<integer 2000 and a>integer 1499), then search predicates may ensure that the predicates for the attribute are not applied to other data types (e.g., strings, timestamps, etc.). As discussed below with regard to FIGS. 4-6, in some embodiments a search predicate may add Boolean operations to limit the search of multi-type attribute index 130 to the data type in the query predicate using the sort order for data types. In some embodiments, the comparison operation may be overloaded or otherwise mapped to a comparison operation specific to the data type of the query predicate (e.g., a string comparator for strings, an array comparator for arrays, and so on).

Search 122 may be performed according to the query plan generated by query engine 120 using search predicate(s) 124 in place of the predicates 104 that were directed to the indexed attribute. In this way, searches of the multi-type attribute index 130 may be directed to locations storing entries that may include data of the type indicate in predicates 104. Results, such as result 106, from the search may include the document identifiers 108 of those documents that have an attribute value that satisfies the predicate.

Please note that previous descriptions of a multi-type attribute index are not intended to be limiting, but are merely provided as logical examples. Different implementations of a document database, query engine, or multi-type attribute index, may be conceived.

This specification begins with a general description of a provider network that may implement a database service that may implement a multi-type attribute index for a document database, in one embodiment. Then various examples of a database service are discussed, including different components/modules, or arrangements of components/module, that may be employed as part of implementing the database service, in one embodiment. A number of different methods and techniques to implement multi-type attribute index for a document database are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
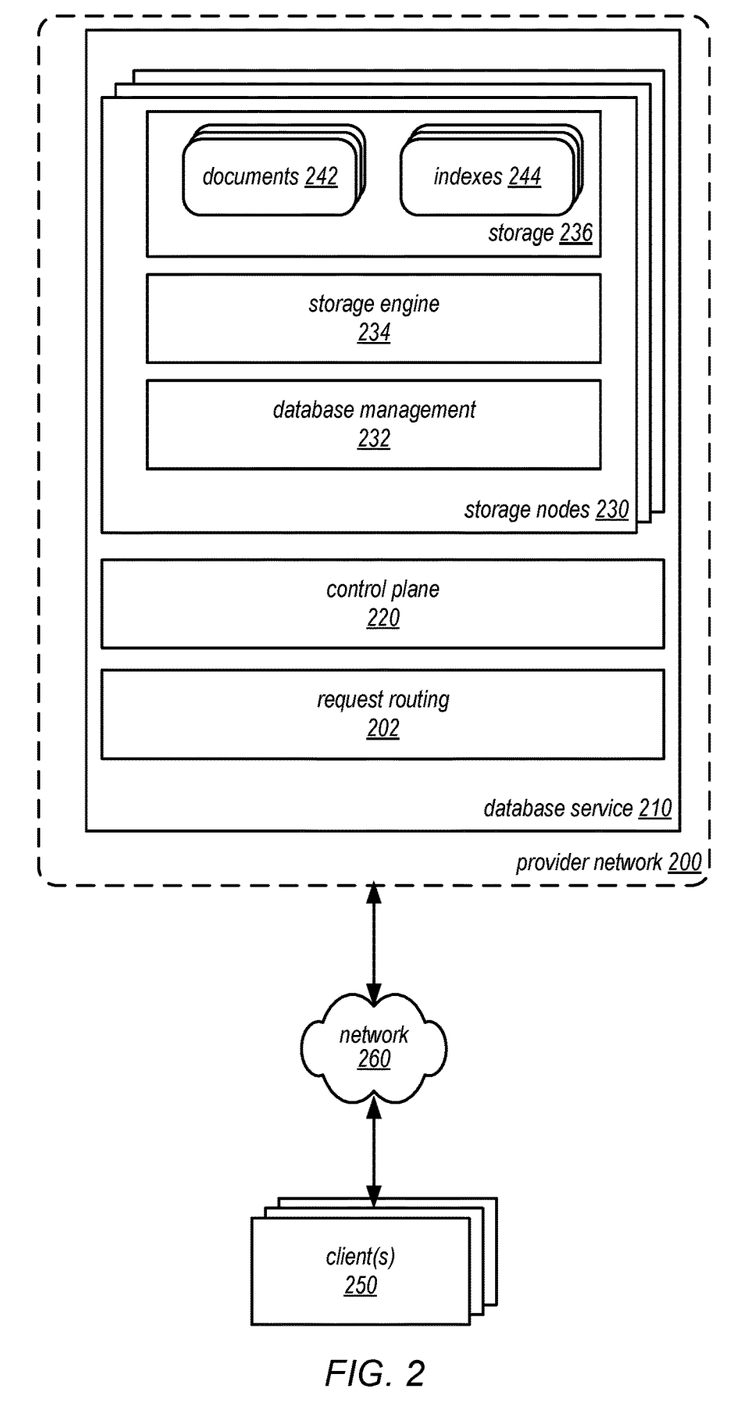
FIG. 2 is a logical block diagram illustrating a provider network that implements a database service that offers a document database, according to some embodiments.

FIG. 2 is a logical block diagram illustrating a provider network that implements a database service that offers a document database, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 250, in another embodiment. In one embodiment, provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. In one embodiment, provider network 200 may implement various computing resources or services, such as database service 210 or other data processing (e.g., relational or non-relational (NoSQL) database query engines, map reduce processing, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 8 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (such as various kinds of non-relational and/or NoSQL databases) for storing, querying, and updating data. In at least some embodiments, database service 210 may provide a document database, storing documents (e.g., JavaScript Object Notation (JSON) documents in a serializable format, such as Application Specific Object Notation (ASON) or Binary JSON (BSON). Such database services 210 may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a query language interface to the database system. In other embodiments, external applications and programs may submit queries using driver interfaces to the database system.

In one embodiment, clients 250 may encompass any type of client configurable to submit network-based requests to provider network 200 via network 260, including requests for database service(s) 210 (e.g., to query a document database 210 that uses a multi-type attribute index). For example, in one embodiment a given client 250 may include a suitable version of a web browser, or may include a plug-in module or other type of code module may execute as an extension to or within an execution environment provided by a web browser. Alternatively in a different embodiment, a client 250 may encompass an application such as a database application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200, in one embodiment. In one embodiment, client 250 may generate network-based services requests according to a Representational State Transfer (REST)-style network-based services architecture, a document- or message-based network-based services architecture, or another suitable network-based services architecture.

In one embodiment, a client 250 may provide access to provider network 200 to other applications in a manner that is transparent to those applications. For example, client 250 may integrate with a database on database service(s) 210. In such an embodiment, applications may not need to be modified to make use of the storage system service model. Instead, the details of interfacing to the database service(s) 210 may be coordinated by client 250.

Clients 250 may convey network-based services requests to and receive responses from provider network 200 via network 260, in one embodiment. In one embodiment, network 260 may encompass any suitable combination of networking hardware and protocols necessary to establish network-based-based communications between clients 250 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in one embodiment, clients 250 may communicate with provider network 200 using a private network rather than the public Internet.

Database service 210 may implement request routing 202, in one embodiment. Request routing may receive, authenticate, parse, throttle and/or dispatch service requests, among other things, in one embodiment. In one embodiment, database service 210 may implement control plane 220 to implement one or more administrative components, such as automated admin instances which may provide a variety of visibility and/or control functions, as described in more detail herein). In one embodiment, database service 210 may also implement multiple storage nodes 230, each of which may manage documents 242 of a data set (e.g., a database) on behalf of clients/users or on behalf of the database service (and its underlying system) which may be stored in storage 236 (on storage devices attached to storage nodes 230) or, in another embodiment, in external storage which may be accessed by storage nodes 230 (e.g., via network connections) (not illustrated).

Control plane 220 may provide visibility and control to system administrators, detect split events for storage nodes, and/or anomaly control, resource allocation, in one embodiment. In one embodiment, control plane 220 may also include an admin console, through which system administrators may interact with the data storage service (and/or the underlying system). In one embodiment, the admin console may be the primary point of visibility and control for the data storage service (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as split requests to be processed, at storage service 230, in one embodiment.

Control plane 220 may direct the performance of different types of control plane operations among the nodes, systems, or devices implementing database service 210, in one embodiment. For instance, control plane 220 may communicate with storage nodes to initiate the performance of various control plane operations, such as moves, splits, update documents, delete documents, create indexes, etc. . . . In one embodiment, control plane 220 may update a task registry (or some other table or data structure) with the status, state, or performance information of the control plane operations currently being performed.

In one embodiment, request routing 202 may support handling requests formatted according to an interface to support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, database service 210 may support different types of web services requests. For example, in one embodiments, database service 210 may implement a particular web services application programming interface (API) that supports a variety of operations on documents (or other data objects) that are maintained and managed on behalf of clients/users by the database service 201 (and/or data stored in those documents). In one embodiment, request routing 202 may perform parsing and/or throttling of service requests, authentication and/or metering of service requests, dispatching service requests, and/or maintaining a partition assignments that map processing nodes to partitions.

Storage nodes 230 may implement database management 232, in one embodiment. Database management 232 may create, update, define, query, and/or otherwise administer databases, in one embodiment. For instance, database management 232 may maintain a database according to a database model (e.g., a non-relational database model). In one embodiment, database management 232 may allow a client to manage data definitions (e.g., Data Definition Language (DDL) requests to describe attributes, requests to add item attributes, etc.). In one embodiment, database management 232 may handle requests to access the data (e.g., to insert, modify, add, or delete data as well as requests to query for data by generating query execution plans to determine which partitions of a database may need to be evaluated or searched in order to service the query). In one embodiment, database management 232 may also perform other management functions, such as enforcing access controls or permissions, concurrency control, or recovery operations. In one embodiment, database management 232 may send requests to storage engine 234 to access documents 242 in order to process queries (e.g., requests to obtain the identify of documents with attributes specified in a query predicate).

In one embodiment, storage nodes 230 may implement storage engine 234 to access storage 236. Storage engine 234 may perform requests on behalf of database management to create, read, update and delete (CRUD) data in a partition, in one embodiment. Storage engine 234 may implement buffers, caches, or other storage components to reduce the number of times storage is accessed, in one embodiment. Storage engine 234 may implement various storage interfaces to access storage 236. In those embodiments where external storage is a network-based data storage service, like another data storage service in provider network 200 in FIG. 2, then storage engine 234 may establish a network connection with the service as part of obtaining access to a storage unit (e.g., by submit requests formatted according to a protocol or API to establish the connection). In another embodiment, storage engine 234 may access internal storage using storage protocols (e.g., Small Computer Systems Interface (SCSI)) over a bus or other interconnect that directly connects a host implementing storage engine 234 with storage 236).

In one embodiment, database service 210 may provide functionality for creating, accessing, and/or managing a document database at storage nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 3. Note also that in one embodiment, one or more storage nodes 230 process queries and other access requests on behalf of clients directed to tables. Some of these storage nodes may operate as if they were in a multi-tenant environment, and others may operate as if they were in a single-tenant environment. In one embodiments, storage nodes 230 that operate as in a multi-tenant environment may be implemented on different storage nodes (or on different virtual machines executing on a single host) than storage nodes that operate as in a single-tenant environment.

In at least some embodiments, the systems underlying the database service 210 described herein may store data on behalf of storage service clients (e.g., client applications, users, and/or subscribers) in documents containing one or more attributes (e.g., a JavaScript Object Notation document). In some embodiments, database service 210 may present clients/users with a data model in which each document maintained on behalf of a client/user contains one or more attributes. The attributes of a document may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The documents may be managed by assigning each document a primary key value (which may include one or more attribute values), and this primary key value may also be used to uniquely identify the document. In some embodiments, a large number of attributes may be defined across the documents in a table, but each document may contain a sparse set of these attributes (with the particular attributes specified for one document being unrelated to the attributes of another document in the same table), and all of the attributes may be optional except for the primary key attribute(s). In other words, the document maintained by the database service 210 (and the underlying storage system) may have no pre-defined schema other than their reliance on the primary key. Note that in some embodiments, if an attribute is included in a document, its value cannot be null or empty (e.g., attribute names and values cannot be empty strings), and, and within a single document, the names of its attributes may be unique.

Figure 3:
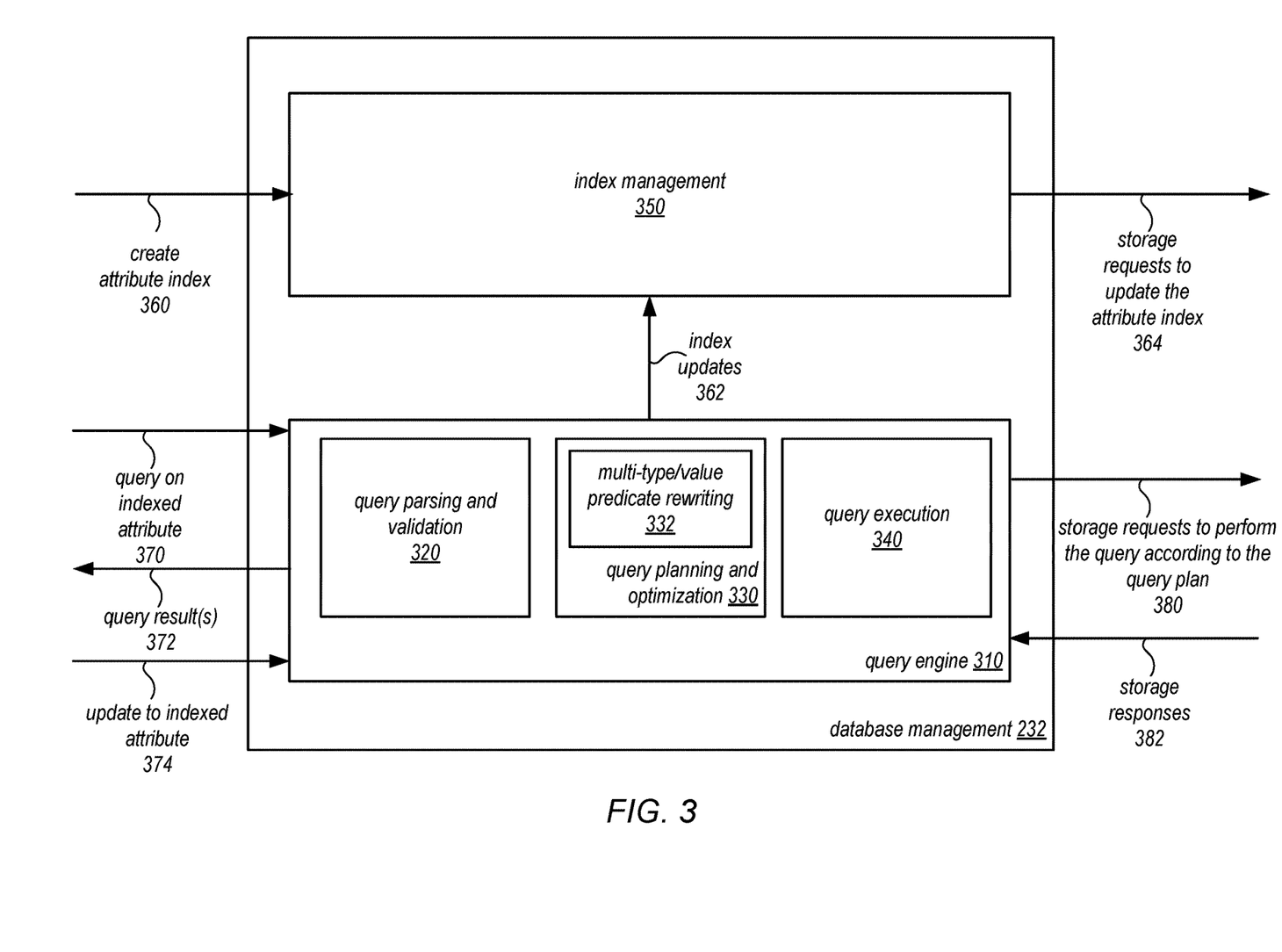
FIG. 3 is a logical block diagram illustrating a query engine and index manager for implementing a multi-type attribute index for a document database, according to some embodiments.

FIG. 3 is a logical block diagram illustrating a query engine and index manager for implementing a multi-type attribute index for a document database, according to some embodiments. Database management 232 may implement index management 350, in various embodiments, to create, maintain, and remove multi-type attribute indexes for a document database. For example, a request to create (or delete) an attribute index 360 may be handled by index management 350. Index management 350 may parse the request to identify the attribute used to create the attribute index. Index management 350 may allocate or obtain storage for the index (e.g., via storage engine 234 in FIG. 2) and issue storage request to create or update the attribute index 364. For example, as discussed below with regard to FIG. 7, index management 350 may scan the documents of the document database to search for the attribute specified in the index, utilize comparison operations for comparing values of the same data type and for comparing values across data types using the sort order for data types (as discussed above with regard to FIG. 1 and below with regard to FIG. 4) to create entries in an index for the attribute values. Also discussed below with regard to FIG. 4, in some embodiments, multi-value attributes may be stored in the attribute index both as the individual data values of the multi-value attribute, and as the complete multi-value attribute. In this way, queries with a predicate that may be satisfied by one or more individual values of a multi-value can be performed without violating type bracketing restrictions, in some embodiments. Index management 350 may notify query engine 310 of the existence of multi-type attribute indexes for the document database in order to utilize the multi-attribute value index (e.g., instead of performing a heap or other brute force scan) to perform a query.

Database management 232 may implement query engine 310, in various embodiments, to handle queries directed to the document database, like a query on an indexed attribute 370, in some embodiments. Query engine 310 may implement query parsing and validation 320, some embodiments. Query 370 may be received, for example and checked for valid form, references, attributes, predicates, operators, etc. In some embodiments query parsing and validation 320 may check for a query implicitly specifying a multi-value attribute by including multiple conflicting predicate values (e.g., attribute a<7 and attribute a>11), and allowing the query to proceed if multi-value attributes have been stored. Similarly, requests to perform data manipulation, such as requests to update an indexed attribute 374 (or document) may be received, which may be likewise parsed, planned, and executed by query engine 310.

Query parsing and validation 320 may generate a parse tree or other parsed form or output of a query, which may identify predicates and the respective attributes of the predicates. In this way, attributes for which a multi-type attribute index exists may be identified to query planning and optimization 330. Query engine 310 may implement query planning and optimization 330 to generate a query plan or other instructions to perform a query, in some embodiments. In at least some embodiments, the query plan may be optimized (e.g., for cost). Cost optimization may include identifying indexes as structures for quickly locating desired data in a query without performing a scan of an entire database. Therefore, query planning and optimization 330 may identify predicates in a query, such as query 370, which are directed to an attribute for which an index exists because the cost of utilizing such a multi-type attribute index may be lower than other operations to perform the query. In some embodiments, queries may be directed explicitly to an index, as if it were a secondary index or materialized view of the document database.

Query planning and optimization 330 may implement multi-type/multi-value predicate rewriting 332 to replace predicates received in a query with predicates that can be applied to search the appropriate portions of an index, in some embodiments. Type bracketing, for instance, as discussed below with regard to FIGS. 5 and 6, may be implemented by replace a predicate with a single Boolean operation (e.g., a<4) with a predicate that includes another comparison to a minimum or maximum value of a neighboring data type according to the sort order of for data types in the index (e.g., a<4 AND a>minimum string value, where strings<integers in the sort order). Predicate rewriting may also be performed to replace a Boolean expression within an overloaded operator specific to the type of data included in the predicate, in some embodiments. If, for instance, the query indicates a Boolean expression where attribute a<"Smith", then multi-type/value predicate rewriting may rewrite the predicate in the plan to invoke a string comparison operation for evaluating the expression with respect to values in the multi-type attribute index. Other operations, such as filtering operations for duplicate documents, or determining whether to include multiple predicates in the index evaluation, as discussed below with regard to FIG. 6, may be implemented by query planning and optimization 330, in some embodiments.

Query engine 310 may implement query execution platform 340 to perform the generated query plan, in various embodiments. Query execution platform may issue storage requests 380 to perform the query according to the plan 380 (which may be received and interpreted by storage engine 234 in order to access the data the underlying storage). Storage responses 382 may be received and evaluated to determine whether attribute values satisfy query 370 predicate(s). In at least some embodiments, caching or other buffering techniques may be implemented to store, for example, all or a portion of an index in memory for quick access. Query execution engine 340 may perform operations to join, filter, aggregate, order, or other predicates or operations specified or caused by queries, such as query 370. Query engine 310 may then provide the results 372 of the query, in some embodiments. Results 372 may be, for instance, a list of document identifiers which store the attribute and satisfy the query, in some embodiments.

When other statements handled by query engine 310, such as insertions or deletions of documents or attributes included therein (e.g., request 374), query engine 310 may provide index updates 362 in addition to performing the storage requests to achieve the requested change in the document database, in some embodiments. For example, index update 362 may notify index management to insert a new attribute value for an indexed attribute.

Figure 4:
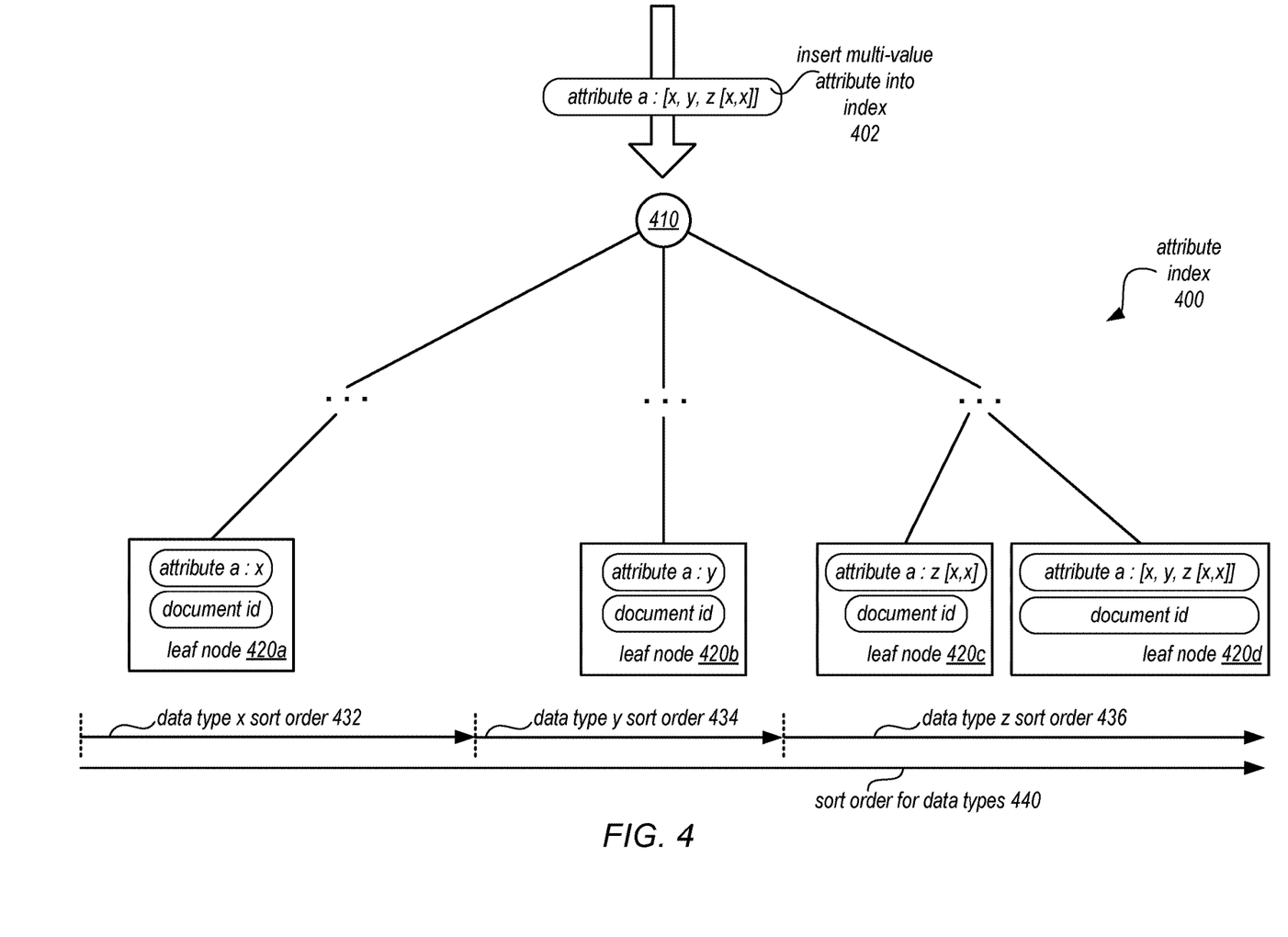
FIG. 4 is an example illustration of a multi-type attribute index, according to some embodiments.

FIG. 4 is an example illustration of a multi-type attribute index, according to some embodiments. Attribute index 400 may be a tree-based index structure, such as a b-tree index, in some embodiments. A root node 410 may specify the various attribute value ranges for child nodes, which may in turn specify the respect value ranges of the child nodes until leaf nodes, such as leaf nodes 420a, 420b, 420c, and 420d are reached. Insertions (and deletions) from attribute index may be made according to a sort order for data types 440. For example, the sort order 440 for data types may specify that numbers<strings<arrays<timestamps<Booleans and so on. Insertions or deletions that compare a value of the attribute that is one data type with a value of another data type may utilize sort order 440 to determine relative placement of the value with respect to that other data type. Additional, sort orders or comparisons within a data type may be used to compare values of the same data type, such as data type x sort order 432, data type y sort order 434, and data type z sort order 436.

One of the data types attribute index 400 may store is multi-value data types such as arrays, objects, expressions or other multi-value information that is considered a single value for that attribute in a document. In order to leverage the same index search, scan or evaluation for performing queries that is used for attribute index 402, multi-value attributes may be decomposed so that queries that are directed to searching for one or more values that may be present in the multi-value attributed (e.g., a query to return a document with at least one element in an array that satisfies one or more conditions).

As illustrated in FIG. 4, a multi-value attribute 402 may be inserted into index attribute 400. Attribute 402 (attribute a) may be an array that includes values of different data types, x, y, and z[x,x] (which may be a multi-value attribute, like an array, within the array). Insertion of the multi-value attribute may separate the values of the array into singular or scalar elements or values, in some embodiments. In this way, a query that searches for at least one value of a multi-value data type that includes a value that satisfies a condition in predicate may be evaluated by evaluating the individual scalar values in addition to the multi-value data type (which may allow for features like type-bracketing as discussed below with regard to FIGS. 5 and 6 to be enforced) For instance, leaf node 420a may store (in a portion of the index storing other type x values, attribute a="x" and the document id of the document including attribute a. Similarly, leaf node 420b may store attribute a="y" and the same document id, leaf node 420c may store the attribute value a="z[x,x]", and leaf node 420d may store the entire multi-value attribute a="[x, y, z[x,x]]." If a query directed to attribute "a" as was performed, then the individual attribute values may be evaluated at the different leaf nodes 420 (including both the individual values and the multi-value) to determine whether a predicate was met.

Figure 5:
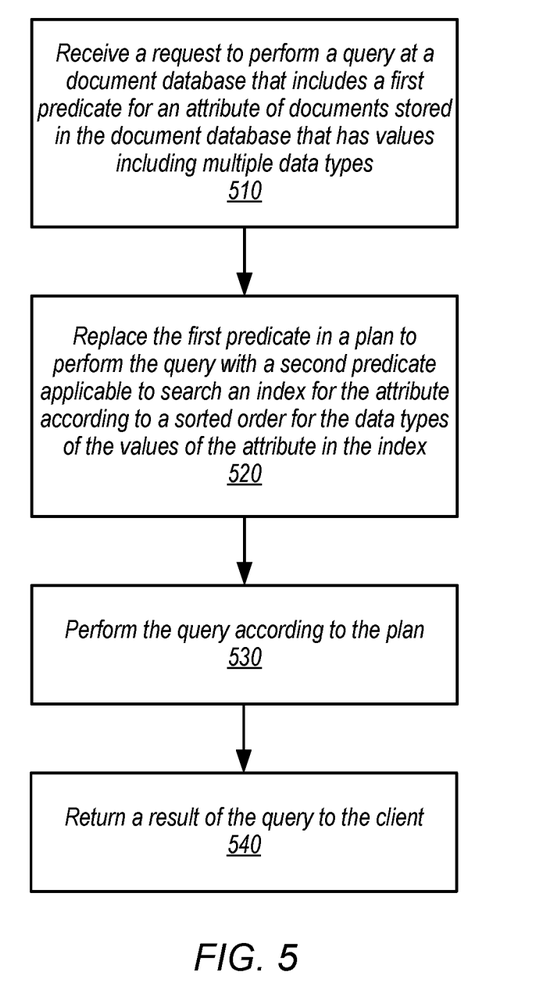
FIG. 5 is a high-level flowchart illustrating various methods and techniques to implement a multi-type attribute index for a document database, according to some embodiments.

The examples of multi-type attribute index for document databases as in FIGS. 2-4 have been given in regard to a database service (e.g., a non-relational or NoSQL database service that stores documents on behalf of a client of the service). However, various other types of non-relational or NoSQL database systems or data processing systems that provide a document database may implement a multi-type attribute index, in other embodiments. FIG. 5 is a high-level flowchart illustrating various methods and techniques to implement a multi-type attribute index for a document database, according to some embodiments. These techniques, as well as the techniques discussed with regard to FIGS. 6-7, may be implemented using components or systems as described above with regard to FIGS. 2-4, as well as other types of databases, storage engines, systems, or clients and thus the following discussion is not intended to be limiting as to the other types of systems that may implement the described techniques.

As indicated at 510, a request to perform a query at a document database that includes a first predicate for an attribute of documents stored in the document database that has values n include multiple data types may be received, in various embodiments. The query may be specified according to various languages (e.g., Structured Query Language (SQL)—which may be translated to other protocols or languages), protocols, or programmatic interfaces (e.g., API calls to search, look, find, get, etc.), in some embodiments. The query may include one or more predicates which describe desired data to be returned, in some embodiments. For example, a predicate may identify or specify an attribute of documents to search for with a desired value or values using Boolean operations. As discussed above with regard to FIG. 1, the operations for comparing attribute values with respect to the predicate may include determining whether a value of the attribute being evaluated with respect to the predicate satisfies the predicate as true using <, <=, =, >, >=. In addition to the comparison, the predicate may also specify the data type of the values of the attribute to be compared (e.g., strings, integers, Booleans, arrays, etc.).

As indicated at 520, the first predicate may be replaced in a plan to perform the query with a second predicate applicable to search an index for the attribute according to a sorted order for the data types of the values of the attribute in the index. For example, the first predicate may only specify one data type for comparing the values of the attribute, as noted above. The second predicate may be a form of the first predicate that is rewritten to amend, append, or otherwise account for other data types for the attribute that may be encountered in the index. For example, additional or conjunctive comparisons made with respect to other data types based on the specified comparison and data type may be determined and included. If, for instance, the comparison is for an integer data type equal to a value of "12345" then additional comparisons may be added to search for a string data type with a value of "12345". In some embodiments, query planners and/or optimizers that are responsible for generating the query plan for the query may intelligently identify what other comparison operations to include (e.g., using text predication or other machine learning techniques to recognize equivalent data stored in other data types).

In some embodiments, the query may specify that only the data type specified in the query predicate be consider (sometimes referred to as type-bracketing). Type bracketing may be automatically applied, in some embodiments, such as is discussed below with regard to FIG. 6. Comparisons may be added as conjunctive part of the second predicate (e.g., joined by "and") to exclude the other data types, in some embodiments. The sorted order of data types may allow for comparisons to exclude ranges of values based on the sorted order so that if, for instance, all array types are greater in value than all integer data types (e.g., a sort order of string integer array), and an integer data type is specified in the predicate, then the second predicate may include a comparison that specifies all values for the attribute less than the minimum array value (and greater than the maximum string value, depending on whether a search would be performed in the index for values less than the minimum value of the specified data type).

Once the first predicate is replaced with the second predicate, the query may be performed according to the plan, as indicated at 530, in various embodiments. The query plan may be executed or caused to execute by a query engine for the document database, including performing various storage operations (e.g., via a storage engine) to scan, search, or otherwise evaluate various portions of the index using the second predicate. For tree-based index structures, such as a b-tree, comparison operators for performing the second predicate may be used to navigate different branches of the tree structure, in some embodiments. Identified attribute values that satisfy the predicate may also be associated with or co-located with an identifier, link, or location to a document that stores the attribute, in some embodiments. As indicated at 540, a result of the query may be returned to a client, in various embodiments. The result may include the identifier, link, or location of the documents, in some embodiments, associated with attribute values that satisfy the second predicate. The result may be formatted according to a same interface, protocol, or language as the query, in some embodiments.

Figure 6:
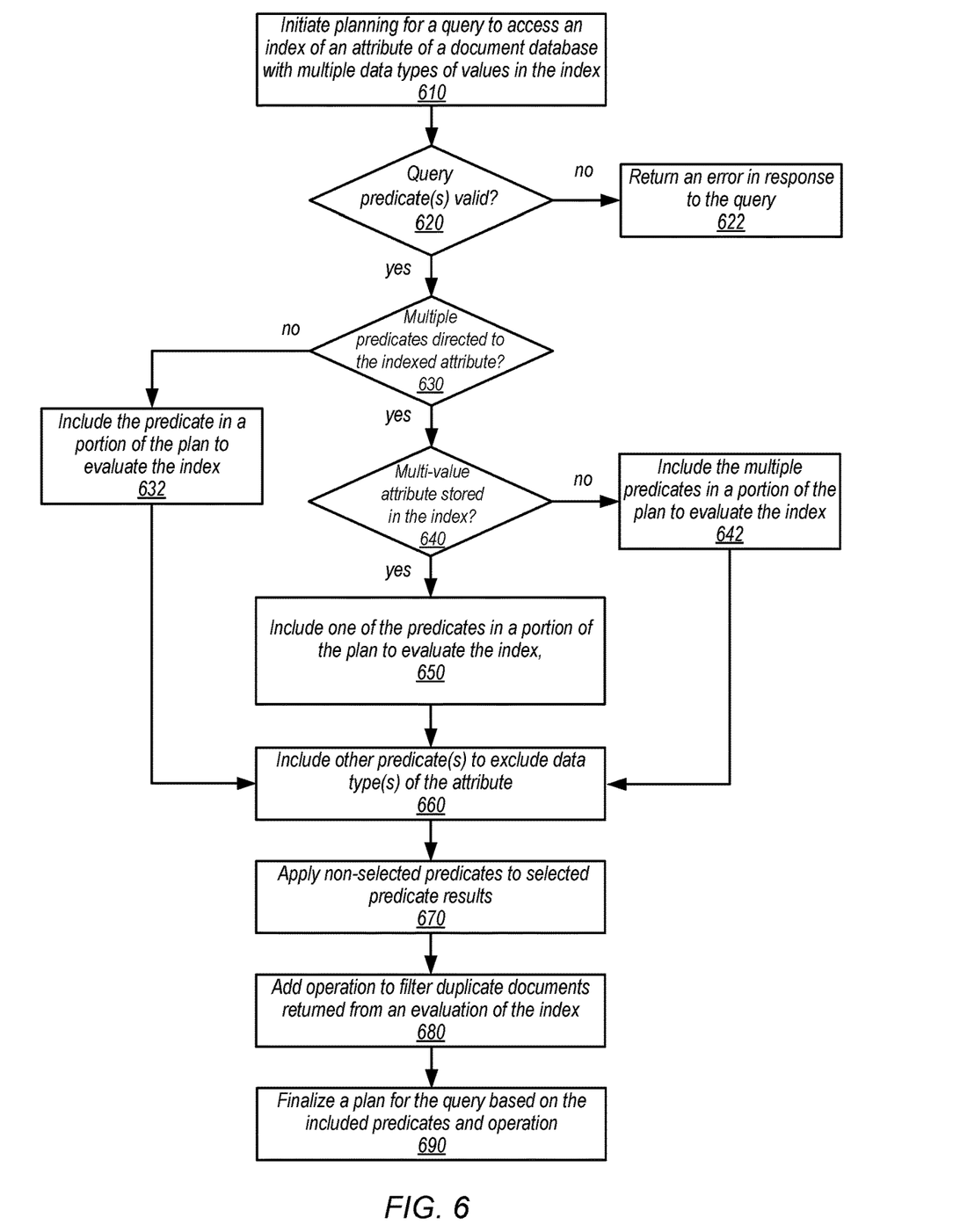
FIG. 6 is a high-level flowchart illustrating various methods and techniques to generate a query plan for a multi-type attribute index, according to some embodiments.

FIG. 6 is a high-level flowchart illustrating various methods and techniques to generate a query plan for a multi-type attribute index, according to some embodiments. As indicated at 610, planning for a query may be initiated to access an index of an attribute of a document database with multiple data types of values in the index, in various embodiments. In some embodiments, predicate(s) of a query may be validated, as indicated at 620. If, for example, the query specifies an incorrect attribute name, unsupported data type, or an invalid comparison, then the predicate may be invalid. In some embodiments, predicates that would be considered invalid for databases that only store one value per attribute may be allowed. For example, if a query is received with a predicate that specifies "a<3 AND a>8" the query may still be valid for attributes that store an array of values including a value less than 3 and a value larger than 8. In some embodiments, metadata or other information for an index may identify whether a multi-value attribute has been stored in the index. If not, then the query predicate may be considered invalid in scenarios that could only be satisfied by a multi-value attribute. For those queries with an invalid predicate, an error may be returned in response to the query, as indicated at 622, in some embodiments.

Because multiple predicates directed to the indexed attribute may be included in a query, in some embodiments, different optimizations or techniques for handling multiple predicates when evaluating a multi-type attribute index. As indicated by the positive exit from 630, a determination may be made as to whether a multi-value attribute has been stored in the index, as indicated at 640, in some embodiments. For example, if an array for the attribute has been stored in one of the index entries, then metadata indicating that a multi-value attribute has been stored may be flagged, set, or otherwise updated to indicate the presence of a multi-value attribute in the index. If no multi-value attribute has been stored in the index, then as indicated at 642, then multiple predicates may be included in a portion of the plan to evaluate the index, in some embodiments. In this way, the processing of intermediate results from the index based on a single predicate can be eliminated as each predicate may be evaluated for an entry of the index.

As indicated by the positive exit from 640, when multi-value attributes are stored in the index, one of the predicates is included in a portion of the plan to evaluate the index, while the non-selected predicates may be applied to the results of the selected predicate, as indicated at 650, in various embodiments. In this way, a multi-value attribute stored as scalar elements and as a whole (as discussed above with regard to FIG. 4) may not be improperly excluded from a result of a query. Consider an example where an attribute value is an array, "[1, 10, 20]." If the array were stored in the index separate (as "1," "10," "20," and "[1, 10, 20]"), then passing two predicates (e.g., a<"8" and a>"4" would not return any matching results (as none of the single values could satisfy both predicates and the predicates may not perform the comparison of number to array if type bracketing is enabled). If instead the predicate a<"8" were selected, then the returned attribute value could be also compared to see if it evaluated true using the remaining predicate "a<4," (which it would because "1" of the array values is less than "4"). As indicated at 632, if multiple predicates directed to the indexed attribute are not included then, the predicate may be included in a portion of the plan to evaluate the index.

As indicated at 660, other predicate(s) to exclude data type(s) of the attribute may be included, in some embodiments. If, for instance, the data type of the query bracket is a string, then Boolean comparisons according to the sorted order for data types may be used as predicates to exclude other data types by including a predicate that specifies that the value be less than (and/or greater than) the minimum or maximum value of the adjacent type of data, in some embodiments. In this way, multiple types of data can be stored in the same index, preserving a sorted order in order to make the index searchable while retaining the difference in data type.

As indicated at 670, in some embodiments, an operation to filter duplicate documents returned from an evaluation of the index may be added to the plan. For example, because a multi-value attribute may be also stored as individual scalar values, multiple of the scalar values may satisfy a predicate. However, only 1 indication of a document should be returned as the scalar values are not representative of independent values but part of a composite value. Filtering out duplicate documents may prevent returning an erroneous result of multiple documents satisfying a query when only 1 document satisfies the query, for instance.

As indicated at 680, a plan for the query based on the included predicates and operation may be finalized, in various embodiments. Instructions to perform index evaluations may be generated for the included predicates, residual or intermediate processing predicates may be instructed to be performed upon intermediate results of index evaluations, and filter operations may be performed upon query results prior to returning the results to the client, in the plan, in some embodiments. In some embodiments, duplicate documents may be filtered by performing a bitmap index scan.

Figure 7:
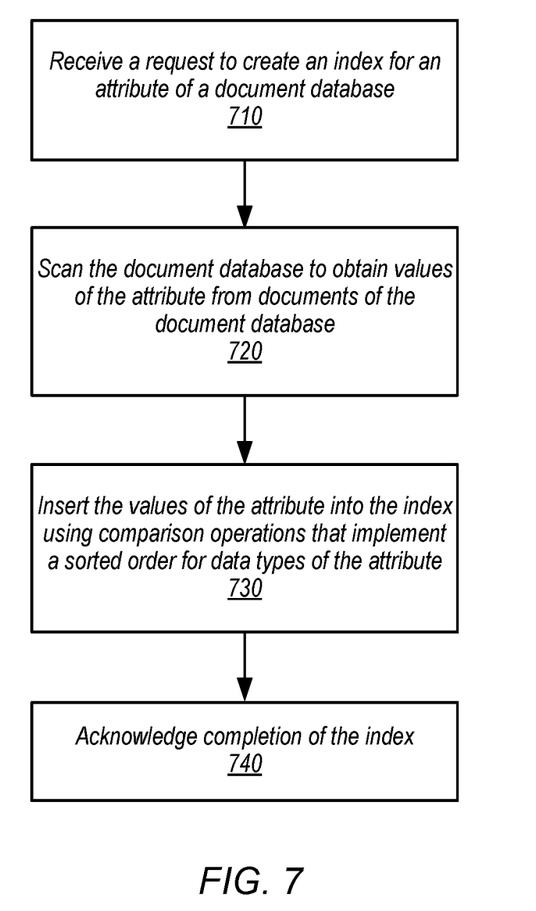
FIG. 7 is a high-level flowchart illustrating various methods and techniques to create a multi-type attribute index, according to some embodiments.

FIG. 7 is a high-level flowchart illustrating various methods and techniques to create a multi-type attribute index, according to some embodiments. As indicated at 710, a request may be received to create an index for an attribute of a document database, in some embodiments. The request may be received according to a programmatic interface (e.g., a create index API), script, language, statement or other protocol. The request may identify the attribute of the document database, in some embodiments. For example, the request may specify an attribute name or other identifier.

As indicated at 720, the document database may be scanned to obtain values of the attribute from documents of the document database. Documents, as discussed above with regard to FIG. 1, may be stored in a format that can be serialized or read, such as BSON or ASON. Scanning the documents may include accessing the documents, reading the documents in the stored format to look for the identified attribute in the document. If the attribute is present, the value may be retrieved along with an identifier for the document for insertion into the index.

As the values are obtained (or once all of the values are obtained, the values of the attribute may be inserted into the index using comparison operations that implement a sorted order for data types of the attribute, as indicated at 730, in various embodiments. For example, each value of the same data type may be compared with other values in the index of the same data type using comparisons, <, <=, =, >, >=, for the data type (e.g., string comparisons, array comparisons, timestamp comparisons, etc.). In addition to comparing the value of the attribute with those values stored in the same type, the value may also be compared with those values of other data types using the sorted order for data types (e.g., string→timestamp→array→integer). Insertion techniques may depend on the index structure being used. For instance, b-tree insertion techniques may be performed to make comparisons of a value to be inserted according to the value ranges mapped to child nodes starting from the root node to perform an insertion at a leaf node (and any needed splitting or rebalancing that may occur as a result).

Completion of the index may be acknowledged, as indicated at 740, in various embodiments. The acknowledgment may be specified according to the same format or interface as the request was submitted, in some embodiments. Similar techniques for updating the index may be performed as creating the index, inserting or removing (or marking for deletion or to be ignored) those values of the attribute that are removed from the document database (e.g., due to an edit to the document or removal of the document), in some embodiments.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 8:
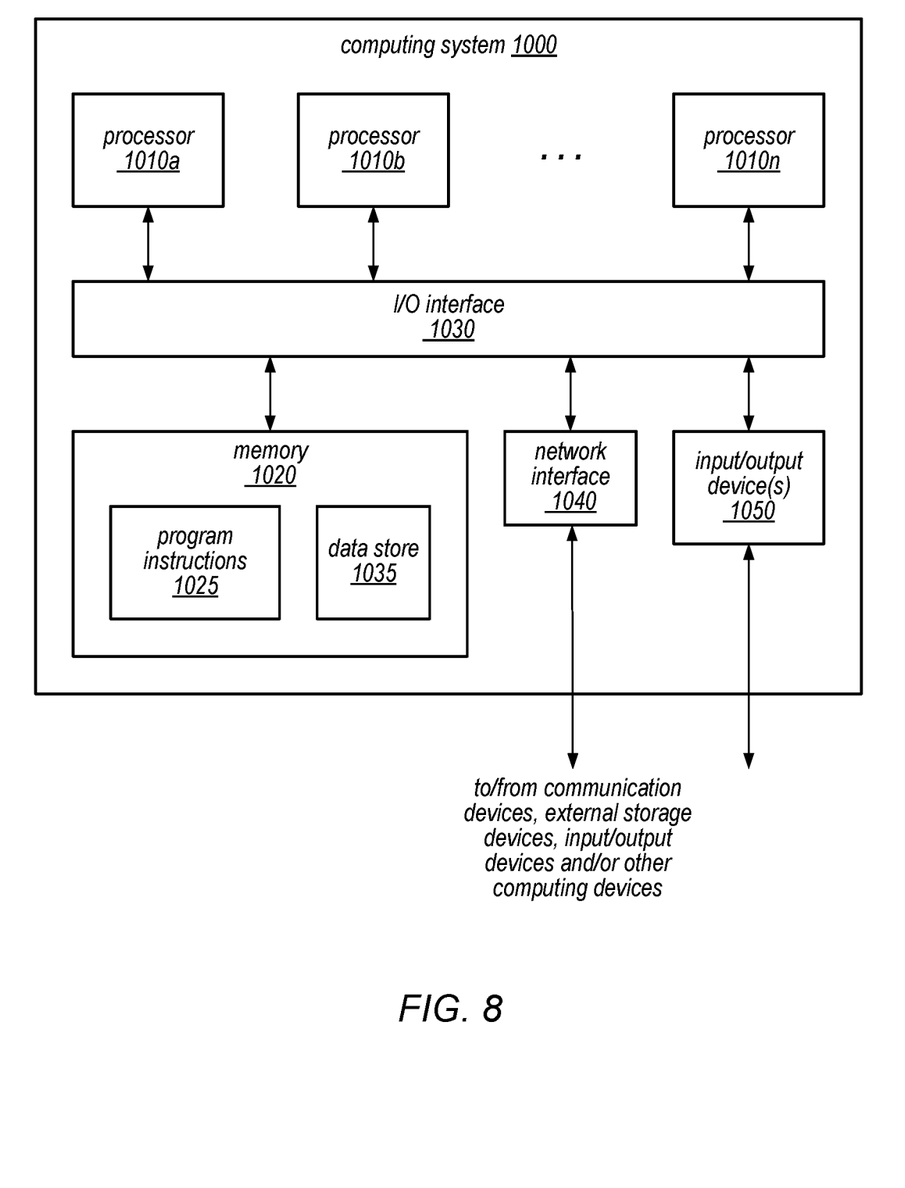
FIG. 8 is a block diagram illustrating an example computing system, according to some embodiments.

Embodiments of multi-type attribute indexes for document databases as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a memory to store program instructions which, if performed by at least one processor, cause the at least one processor to perform a method to at least:
        receive a request to perform a query at a document database that includes a first predicate for an attribute of documents stored in the document database, wherein different respective values of the attribute include a plurality of data types;
        generate a plan to perform the query that replaces the first predicate with a second predicate applicable to search an index for the attribute according to a sorted order for the data types of the different respective values in the index;
        perform the query according to the plan; and
        return a result of the query to a client.

2. The system of claim 1, wherein the program instructions cause the at least one processor to perform the method to further:
    receive a request to create the index for the attribute;
    in response to the receipt of the request to create the index:
        scan the documents of the document database to obtain the respective values from the documents of the document database; and
        insert the respective values into the index using comparison operations that implement the sorted order for the data types.

3. The system of claim 2, wherein at least one of the respective values is a multi-value attribute, and wherein to insert the respective values into the index, the program instructions cause the at least one processor to perform the method to:
    insert individual values of the multi-value attribute in separate entries of the index; and
    insert the multi-value attribute in another entry of the index.

4. The system of claim 1, wherein the at least one processor and the memory are implemented as part of a network-based database service, wherein the document database is stored in the database service on behalf of a client of the database service, and wherein the query is received via an Application Programming Interface (API) for the network-based service.

5. A method, comprising:
    receiving a request to perform a query at a document database that includes a first predicate for an attribute of documents stored in the document database, wherein different respective values of the attribute include a plurality of data types;
    replacing the first predicate in a plan to perform the query with a second predicate applicable to search an index for the attribute according to a sorted order for the data types of the different respective values in the index;
    performing the query according to the plan; and
    returning a result of the query to a client.

6. The method of claim 5, wherein the second predicate includes a predicate that excludes one or more of the data types according to the sort order for the data types.

7. The method of claim 5, further comprising updating the index to include an additional value of the attribute stored in the document database using one or more comparison operations that implement the sorted order for the data types.

8. The method of claim 5, wherein performing the query according to the query plan, comprises:
    determining that the index does not store a multi-value attribute; and
    response to the determining, including an additional predicate with the second predicate to be applied when searching the index.

9. The method of claim 5, wherein performing the query according to the query plan comprises:
    determining that the index does store a multi-value attribute; and
    response to the determining, applying an additional predicate to intermediate results from the search of the index applying the second predicate.

10. The method of claim 5, wherein the plan further comprises an operation to remove duplicate documents returned from an evaluation of the index.

11. The method of claim 5, further comprising:
receiving a request to create the index for the attribute;
in response to receiving the request to create the index:
- obtaining the respective values from the documents of the document database; and
- inserting the respective values into the index using comparison operations that implement the sorted order for the data types.

12. The method of claim 11, wherein at least one of the respective values is a multi-value attribute, and wherein inserting the respective values into the index comprises:
- inserting individual values of the multi-value attribute in separate entries of the index; and
- inserting the multi-value attribute in another entry of the index.

13. The method of claim 11, wherein the index is a b-tree, and wherein inserting the respective values into the index comprises identifying respective leaf nodes for the respective values according to the comparison operations.

14. A non-transitory, computer-readable storage medium, storing program instructions that when executed by one or more computing devices cause the one or more computing devices to implement:
- receiving a request to perform a query at a document database that includes a first predicate for an attribute of documents stored in the document database, wherein different respective values of the attribute include a plurality of data types;
- rewriting the first predicate to replace the first predicate with a second predicate a second predicate applicable to search an index for the attribute according to a sorted order for the data types of the different respective values in the index;
- including the second predicate as part of a plan to perform the query;
- performing the query according to the plan; and
- returning a result of the query to a client.

15. The non-transitory, computer-readable storage medium of claim 14, wherein the program instructions cause the one or more computing devices to further implement:
- receiving a request to create the index for the attribute;
- in response to receiving the request to create the index:
  - scanning the documents of the document database to obtain the respective values from the documents of the document database; and
  - inserting the respective values into the index using comparison operations that implement the sorted order for the data types.

16. The non-transitory, computer-readable storage medium of claim 15, wherein at least one of the respective values is a multi-value attribute, and wherein, in inserting the respective values into the index, the program instructions cause the one or more computing devices to implement:
- inserting individual values of the multi-value attribute in separate entries of the index; and
- inserting the multi-value attribute in another entry of the index.

17. The non-transitory, computer-readable storage medium of claim 16, wherein in performing the query according to the plan, the program instructions cause the one or more computing devices to implement applying the second predicate to the separate entries of the individual values in the index and the other entry of the multi-attribute value of the index.

18. The non-transitory, computer-readable storage medium of claim 14, wherein the second predicate includes a predicate that excludes one or more of the data types according to the sort order for the data types.

19. The non-transitory, computer-readable storage medium of claim 14, wherein, in performing the query according to the query plan, the program instructions cause the one or more computing devices to implement:
- determining that the index does not store a multi-value attribute; and
- response to the determining, including an additional predicate with the second predicate to be applied when searching the index.

20. The non-transitory, computer-readable storage medium of claim 14, wherein the one or more computing devices are implemented as part of a network-based database service, wherein the document database is stored in the database service on behalf of a client of the database service, and wherein the query is received via an Application Programming Interface (API) for the network-based service.

* * * * *